(No Model.) 2 Sheets—Sheet 1.
J. F. APPLEBY.
HARVESTER REEL SUPPORT.

No. 481,218. Patented Aug. 23, 1892.

Witnesses
Arthur Johnson
William Rapelje

Inventor:
John F. Appleby
By J. F. Steward
His Atty (No Model.) 2 Sheets—Sheet 2.
J. F. APPLEBY.
HARVESTER REEL SUPPORT.
No. 481,218. Patented Aug. 23, 1892.
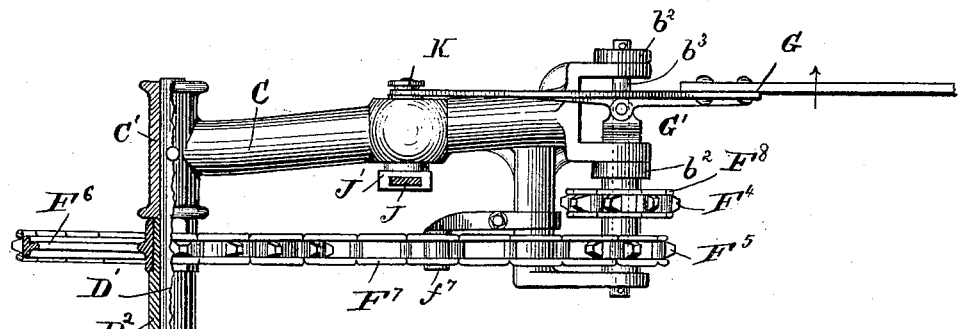
Fig. 2.
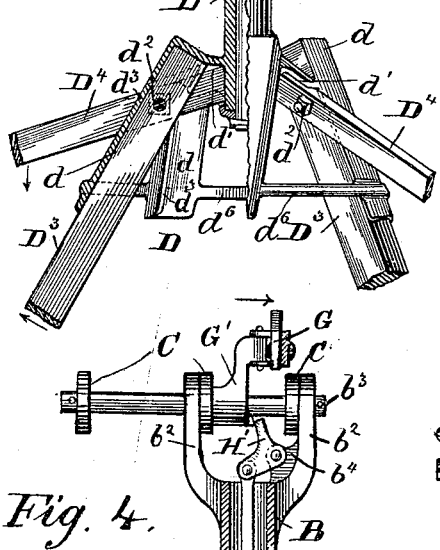
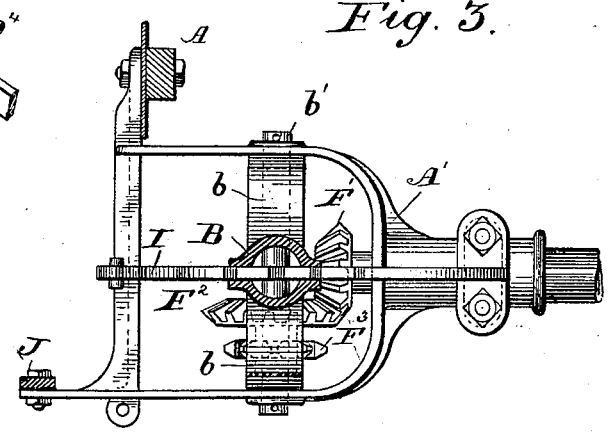
Fig. 3.
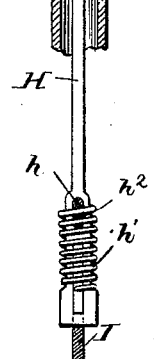
Fig. 4.
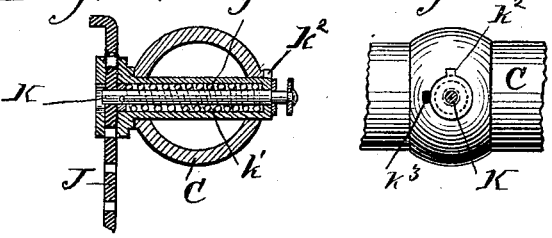
Fig. 5.   Fig. 6.
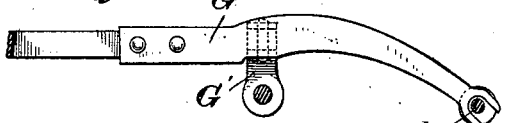
Fig. 7.
Witnesses.
Arthur Johnson
William Rapelye
Inventor.
John F. Appleby
By John F. Steward
His Atty

United States Patent Office.

JOHN F. APPLEBY, OF CHICAGO, ILLINOIS, ASSIGNOR TO THE WILLIAM DEERING & COMPANY, OF SAME PLACE.

HARVESTER-REEL SUPPORT.

SPECIFICATION forming part of Letters Patent No. 481,218, dated August 23, 1892.

Application filed March 14, 1892. Serial No. 424,933. (No model.)

*To all whom it may concern:*

Be it known that I, JOHN F. APPLEBY, of Chicago, in the county of Cook and State of Illinois, have invented certain new and useful Improvements in Harvester-Reel Supports, of which the following is a full description, reference being had to the accompanying drawings.

My invention relates particularly to that class of reel-supports in which the reel is carried on a double-jointed structure capable of adjustment in two directions—namely, fore and aft and vertically; and it consists in certain features whereby greater ease of adjustment and better securement of the reel-arms to the reel-spider are attained.

Figure 1:
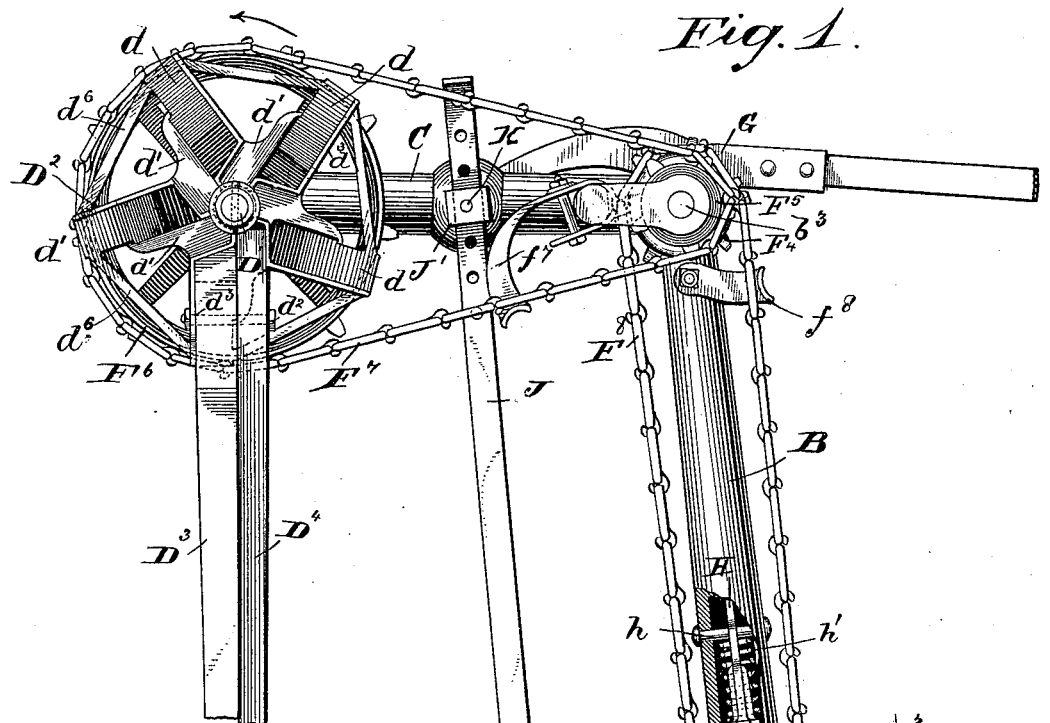
Figure 8:
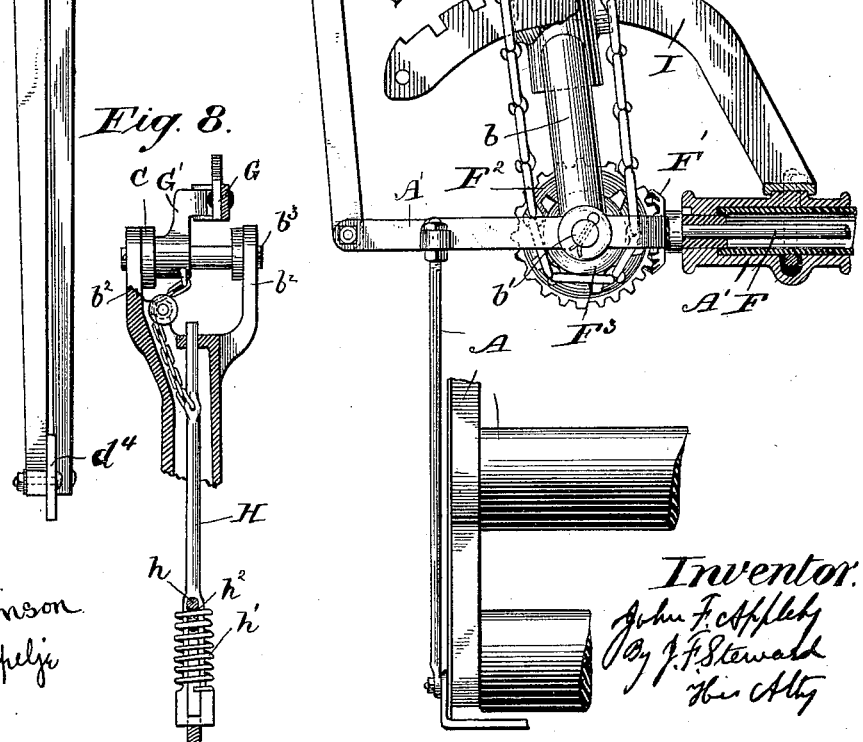

In the drawings, Figure 1 is a side elevation of the reel-support. Fig. 2 is a plan view of the reel-bracket and its assembled parts, some of them being broken away. Fig. 3 is a horizontal section on the line 3 3 of Fig. 1. Figs. 4, 5, 6, and 7 are details. Fig. 8 illustrates how a chain may be connected to the latch-rod and adapted to raise and lower it by a lateral movement of the lever-fulcrum in lieu of the bell-crank.

A is the harvester-frame, and A' is a base-supporting piece, preferably forming a part of the said frame.

B is the reel-standard, having arms $b$ so constructed as to pivot on a shaft $b'$, held in the base-support. The said standard is preferably made hollow in order to support certain mechanism, which will be hereinafter described, and has at its upper end arms $b^2$, carrying the pin $b^3$, on which is journaled the reel-bracket C, carrying the reel-spider D on the stud D', which is non-rotatably secured in the sleeve C' at the forward end of the said bracket.

Rotation is transmitted to the reel in the direction of the arrow shown in Fig. 1 from the general gearing of the harvester in the following manner: F is a shaft connected with gearing (not shown) that is provided for giving motion to the reel and having the pinion F'. Said pinion meshes with the gear $F^2$, which has preferably cast therewith a sprocket-wheel $F^3$. These last two parts $F^2$ and $F^3$ revolve loosely on the shaft $b'$. $F^4$ and $F^5$ are sprocket-wheels made to be as of one piece for convenience, and $F^6$ is a sprocket-wheel keyed to the hub $D^2$ of the reel-spider D. Chains $F^7$ and $F^8$ are thrown over these various sprocket-wheels, as shown in Figs. 1 and 2. Pivoted conveniently to any of the parts are the chain-tighteners $f^7$ and $f^8$, which serve to take up any slack that may be in these said chains. The reel-spider D (shown in section in Fig. 2) contains two series of sockets $d$ and $d'$, in which two series of arms $D^3$ and $D^4$ lie, one series of arms extending outwardly to one end and the other to the other end of the fans $d^4$, which go to make up the reel. Each pair of arms (and by "pair" I mean those which at their outer ends are secured to the stubble and grainward ends of the same fan) are held in their respective sockets by one bolt $d^2$, which secures them directly to the flange $d^3$ of the socket $d$. The said arms being bolted to the reel-fans at their opposite ends, they form with the said fans a triangular structure, which is prevented from collapsing by the form of the socket $d$, as will be seen by referring to Figs. 1 and 2.

Coming now to the adjustment of the reel, the movements to position may be made as follows: G is the hand-lever by means of which the operator makes the said adjustment, and differs from those heretofore used, in that it is so secured pivotally to its fulcrum as to be capable of a movement in addition to those by which the reel is adjusted, which movements are utilized to unlock the reel so that the adjustments may be changed, and in that its fulcrum G' is capable of a sliding movement for the same purpose. The said fulcrum G' is a sleeve, which is shown in the drawings supported upon the pin $b^3$. H is a latch-rod, preferably supported in the standard B upon the pin $h$, and connected at its upper end to a bell-crank H', (see Fig. 4,) which is pivotally supported upon a lug $b^4$ upon the said standard. I have shown this latch-rod and its associated parts as being supported in the hollow standard; but it is obvious that, if desired, it could be supported on the outside of said standard without departing from the principles of my invention. The said latch-rod engages the quadrant I, which passes through convenient slots in the standard B, and it is raised from engagement with the said quadrant against the pressure of a spring $h'$ upon the application of stress upon the hand-lever in the direction of the arrows shown in Figs. 2 and 4, which causes the fulcrum $G'$ to slide upon the pin $b^3$, the sliding movement of said fulcrum raising the said latch-rod through the instrumentality of the bell-crank $H'$. The hole $h^2$ in the said latch-rod, which takes the pin $h$, is slotted so as to allow the above-described movement of the said rod. The lever G is extended forward from its fulcrum to the latch-pin K of the locking device, with which the vertical adjustment is retained. J is a bar pivoted to the harvester-frame at its lower end, and sliding at its opposite end in the socket $J'$, which is journaled in the arm C. In the said socket is the latch-pin K, loosely held in the forward end of the hand-lever, and held in engagement with any one of the number of holes in the bar J by a spring $j'$. To withdraw this latch from engagement with the said bar, stress is applied to the hand-lever in the opposite direction to that of the arrows shown in Figs. 2 and 4, the object of so withdrawing it being to adjust the reel to any definite vertical position.

The method of constructing the socket $J'$ and the latch-pin K and their associated parts is as follows: The said latch-pin, having a shoulder formed thereon near its engagement end, is introduced into the chamber $k'$ in the socket $J'$ from its large end, which is slotted for the purpose of holding the bar J. The said chamber is large enough to receive the said latch-pin and the spring $j'$, and has at its opposite end a hole through which the latch-pin projects, where two collars are secured in any of the well-known ways, so as to adapt it to take the forked end of the hand-lever. The socket $J'$ is inserted into the aperture formed in the bracket C from the side on which the bar J is, having at its small end a projection $k^2$. There is cut in the side of said aperture a slot $k^3$, corresponding in size and form to the above-mentioned projection. The position of the slot around the aperture is such that when the socket has been put into place and turned on its axis so as to be in position to take the bar J the projection $k^2$ will act as a collar to keep the said socket in place, the said bar preventing any possibility of the said projection slipping into the slot $k^3$. These last-described parts are constructed in this manner in order to avoid the inconvenience of having a number of small parts capable of being lost when the machine is taken down for any purpose, and the socket carrying the spring and the latch-pin are always kept together.

Turning the attention to the immediate left-hand portion of Fig. 2, it will be observed that the arm $D^4$ passes buttward some distance from the bolt $d^2$, and that the butt-end portion rests on the inner slope of the wall of the recess in which it lies. Any tendency to pull the arm in the direction of the arrow is thus resisted. It will also be seen that while the arm $D^3$ extends some distance buttward from the bolt $d^2$, it lies under and along the supporting portion of the recess outward from the bolt and under the connecting-bar $d^6$, and that any effort to move the arm in the direction indicated by the arrow adjacent to it is resisted. The fans connecting these two at their outer ends form a tie that tends to produce stress in the direction indicated by the arrows when properly bolted, and hence I have not only a triangle, but one the members of which are firmly based in the spider.

What I claim as my invention, and desire to secure by Letters Patent, is—

1. The combination, with a reel-standard pivoted at its base, of a quadrant secured to the harvester-frame, a latch, a hand-lever having the horizontally-sliding fulcrum, and mechanism connecting said latch with said fulcrum, whereby lateral movement of the lever-fulcrum produces a disengaging movement of the latch, substantially as and for the purpose set forth.

2. The combination, with a reel-standard pivoted at its base, of a quadrant secured to the harvester-frame, a latch-rod, a hand-lever having a sliding fulcrum, and a bell-crank connecting said latch-rod to said fulcrum, substantially as and for the purpose set forth.

3. The combination, with a hollow reel-standard pivoted at its base, of a latch-rod within said standard, a quadrant with which the said latch engages, secured to the harvester-frame, a hand-lever having the horizontally-sliding fulcrum, and a bell-crank pivoted below the fulcrum-pin, having an arm reaching substantially to the center of the standard and to a rod connecting said latch to said fulcrum-piece, substantially as and for the purpose set forth.

4. The combination, with the pivoted standard B, of the quadrant I, the arm C, pivotally connected to the standard B, the bar J, and the locking-pins K and H, the former adapted to engage the said bar J and the latter the quadrant I and both connected to the lever G in such a manner that the latter may operate either of the latching devices at will, substantially as and for the purpose set forth.

5. The reel-spider, the reel-arms seated therein, the seats for the said arms, having a flange at one side and a single bolt passing through the said flange and through both of said arms, one of which arms passes behind the connecting-bar $d^6$, and a reel-fan secured to the ends of the said arms and adapted to draw them nearer together, thus forcing one of the arms against the outer walls of its socket and the other arm against the connecting-bar $d^6$, substantially as described.

JOHN F. APPLEBY.

Witnesses:
F. W. MAKINNEY,
M. A. WHITTLE.